Aug. 29, 1939.        C. SCOTT        2,171,259
PROCESS FOR WELDING FILM
Original Filed April 15, 1933    2 Sheets-Sheet 2
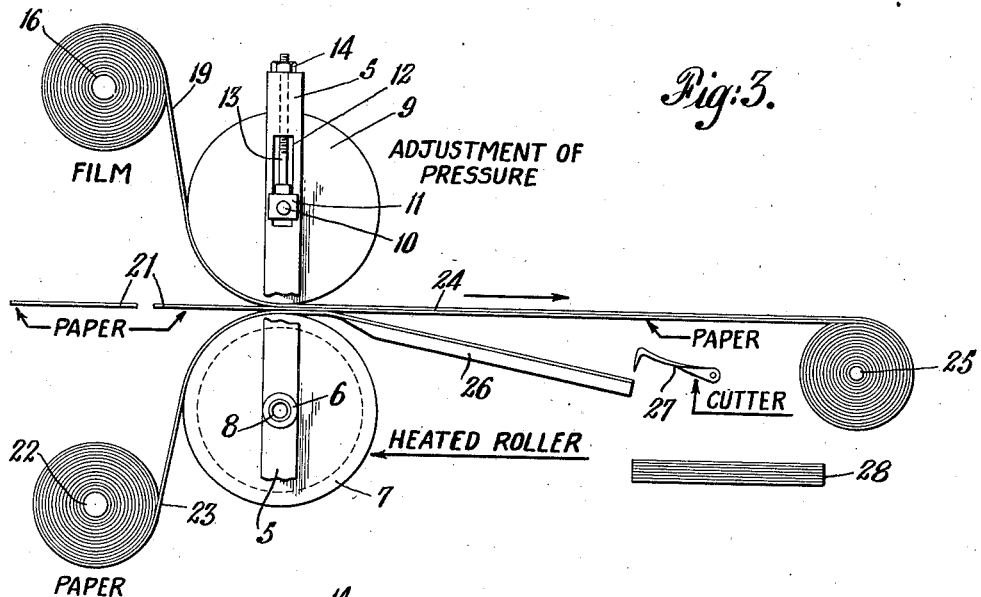
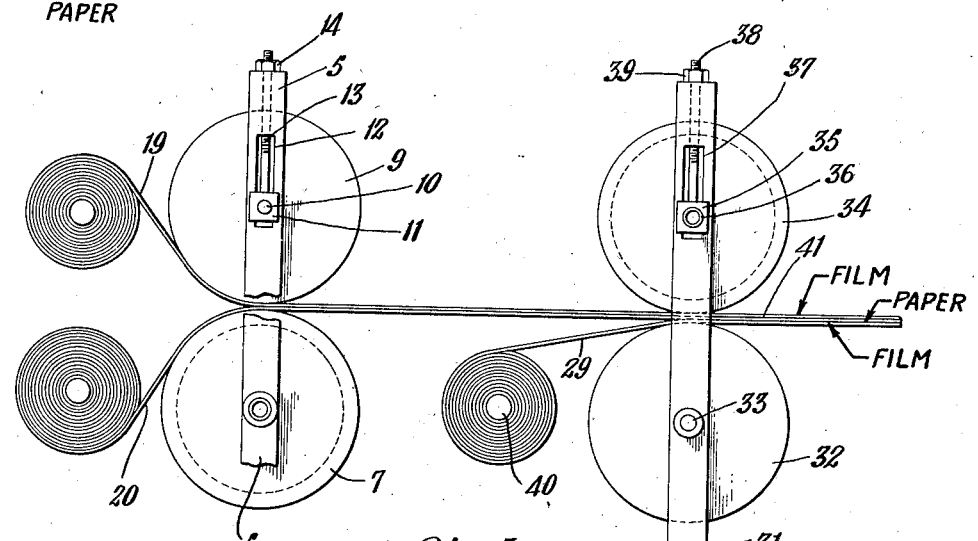
INVENTOR
Clyde Scott Patented Aug. 29, 1939

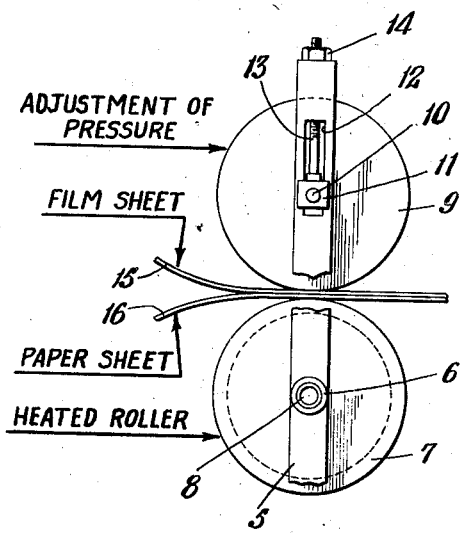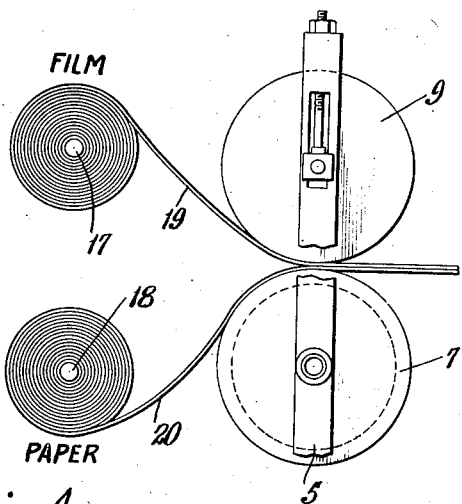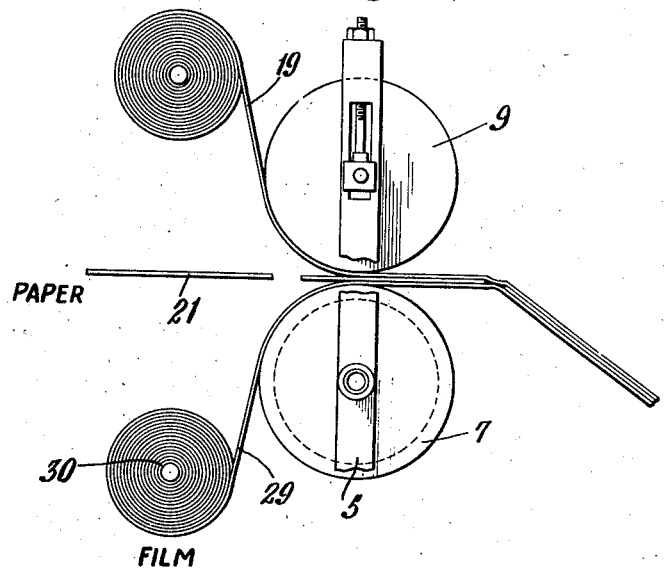

2,171,259

UNITED STATES PATENT OFFICE 2,171,259

PROCESS FOR WELDING FILM

Clyde Scott, East Orange, N. J.

Original application April 15, 1933, Serial No. 666,359. Divided and this application March 25, 1936, Serial No. 70,766

17 Claims. (Cl. 154—40)

This invention is a divisional specification of my co-pending application, Serial Number 666,-359, filed April 15, 1933, for "Process and apparatus for welding film", which has now matured into Patent No. 2,154,474, dated April 18, 1939.

The following described invention relates in general to a film welding process and the machines by which it is applied. Films of reconstructed or regenerated cellulose, or soluble cellulose compositions can be produced successfully in strips or webs of any desired length. Such webs of cellulose may in their final form include a coating which while normally stable and non-tacky, may be rendered adhesive by appropriate manipulation.

It is an object of my invention to provide a process and apparatus by which such a film of coated material either continuous or in separate sheets may be applied in a continuous manner to sheet or web material such as paper, fabric or the like. It is also within the scope of my invention to apply such films mechanically upon opposite sides of a web of paper or the like.

Among the objects of my invention is the provision of means for applying the requisite heat and pressure necessary to successfully weld the film to a web of supporting material such as paper, fabric or the like. By the term "welding" it is to be understood that there is involved the establishment of a tenacious condition of one coated surface of the film and that this coating shall thus be rendered adherent to other material by pressure. The film coating is rendered adhesive by heat and cohesive by pressure accompanied by heat. The film is thereby attached to the adjacent web so closely as to merit description as a weld.

In the feeding of sheets of paper and a web of coating film together through the welding machine there is likelihood that failure of the two materials to register accurately will bring a portion of the film with its dry adhesive coating into contact with the heated roller.

This would cause the film to stick to the roller and for this reason one of the objects of my invention is to protect the roller by a guard or slip strip of paper or the like which can be separated from the welded sheets and film.

A further object of my invention is to moisten or otherwise treat the paper or fabric prior to welding, or to compensate subsequently for the disturbance of normal conditions of the material caused by the welding operation so that the welded product shall have the desired flexibility and flatness.

It is also an object of my invention to provide for applying a coating of film on opposite sides of a single web of paper or fabric either simultaneously or by successive operations.

The composite film and web product resulting from this process and machine has diverse uses among which may be briefly listed the production of water-proof, moisture-proof and odor repellent wrappers for goods and materials; the ornamentation and water-proofing of printed or otherwise decorated papers including posters and similar reinforced or embellished sheets.

By means of this process and apparatus I am enabled to produce a developing or printing paper sensitized for use in the direct production of X-ray and other photographs. It is also possible thus to apply a film of photosensitive gelatin to a web of supporting paper so that the two may be handled together during exposure and development and then separated for subsequent mounting if desired.

The novel arrangement of structurel details whereby the above objects are attained forms a further feature of this invention. Other objects of my invention and advantages of the improved process and apparatus will be evident from a description of the following preferred examples of the process in which—

Fig. 1 is a diagrammatic view of the essential mechanism for welding the co-terminous sheets of film and paper in registration;

Fig. 2 is a further illustration of welding continuous webs;

Fig. 3 is a view of the process as applied to uniting sheets of paper to a continuous film and protecting portions of the latter;

Fig. 4 is a similar view where continuous films are united to opposite sides of separate sheets; and Fig. 5 is a similar view where the paper to be covered is in the form of a continuous web.

By way of example, I have shown a frame or standard 5 in which a lower roll 7 is journalled at 6. This roll is of highly polished steel and is hollow to receive steam or other heating fluid. The heating fluid is admitted through the hollow journal 8 in the bearing 6.

A second roller 9 of suitable hard substance such as hard rubber or paper is carried on a shaft 10 mounted in a vertically sliding journal bearing 11. This bearing 11 is movable vertically in a slot 12 of the standard 5 and adjustment is accomplished by means of the adjusting screw 13 and nut 14. It is to be understood that a standard 5 and its associated bearings is provided on each opposite side of the machine.

This pair of rollers forms the essential features of equipment for carrying out the process in its broader aspect. By feeding through this pair of rollers, a sheet of film 15 and a coterminous sheet of paper, fabric or metal 16 with their edges in registration the sheets are firmly united by the momentary pressure and heat from the rollers. It is to be remarked that the surface of the film facing the sheet of paper has a thin skin or coating of some suitable natural or artificial resin which becomes adhesive when heated. By using a solid rather than a fluid or viscous adhesive it is possible to avoid all side slip of the sheets when passing through the rollers.

When the film and paper, fabric or foil are in the form of continuous webs, than they may be individually fed from rolls. Such an arrangement is shown in Fig. 2.

Suitably mounted on a stand not illustrated, there is provided a series of idle rollers 17 and 18. The roller 17 has a web 19 of this specially manufactured cellulose material. This cellulose film is of any desired length and one or both sides have coatings of normally solid adhesive material. Such material may be a natural or artificial resin of the thermo-adhesive type or a synthetic polymerized vinyl acetate or the like.

The roller 18 carries a continuous web 20 of paper which it is intended to weld with the film 19.

Under those circumstances where the paper is in sheet form and the film a continuous web, the adhesive side of the latter may not all be engaged by the paper but may come in contact with and attach iself to the heated roll 7. To prevent this action the process is carried out as shown in Fig. 3. The standard 5 carries journalled thereon the lower heated roll 7 and the upper adjustable hard roll 9. In addition to the continuous web of film 19 fed from roll 17 there is provided a supply of sheets of paper 21.

From a suitable position and from a reel 22 a second guard or slip strip 23 of paper is fed over and extended angular distance of the heated roll 7 and beneath the sheets of paper 21. In this way any portions of the adhesive surface of film 19 not attached to the paper 21 will stick to paper web 23.

Issuing from the pair of rolls will be the welded paper film 24 which may be conveniently rolled up on roll 25 with the coated or film side out. In this way the coated paper when unrolled will lie flat.

The web 23 is pulled away from paper 21 and caused to travel down table 26. At the end of table 26 the web 23 passes over a cutter bar and is sheared by cutter 27 so that the successive sections form the pile 28.

The extent of preliminary travel of the webs 19 and 23 around the rollers 7 and 9 prior to their union is used to impart heat to the webs so that the welding or union is assisted. The heat from the roller 7 is imparted by indirect transfer through roller 9. This preliminary heating may be adapted to the process regardless of whether the webs being heated are of paper or of film.

The extent of the heating is in some degree dependent upon the thickness and type of the webs passing through the rollers.

The process just described is equally well adapted for welding or uniting two strips of film with an intermediate layer of paper. Where this intermediate layer is in separate sheets the procedure is that outlined in Fig. 4. Here the same pair of heated rollers receives the web 19 of film and a second roll web of film 29 drawn from a supply 30. The web of film 29 takes the place of the paper web 23 and obviously has its adhesive coated face uppermost. The separate sheets 21 of paper, fabric or the like are fed between the films 19 and 29. In this instance the adjacent edges of the sheets 21 may not be in contact and the result is that the films 19 and 29 are thus sealed together beyond the edges of the sheets 21. The delivery of the coated sheets 21 may be in a continuous strip or the sections separated in the manner already described with respect to the form shown in Fig. 3.

In Fig. 5 there has been illustrated a procedure for coating both sides of the web of paper 21 by two layers of film in succession. The standard 5 and the associated rollers 7 and 9 are arranged and operate as has been described already.

The feed of the film 19 and paper 21 to be coated, has been arranged so that the film is above the paper and on the side of the solid roller 9. In this way the heat from the roller 7 is applied to the web of paper and the latter primarily heated before the film is applied. In this way the heat passes through the paper to the near side of the film and does not affect the latter materially except to provide for rendering the lower coated surface of the film adhesive for welding (see Fig. 2).

A second stand 31 is provided beyond the standard 5. On the stand 31 there is provided a lower roller 32 of hard rubber or paper similar to roller 9. This roller 32 is mounted on fixed bearings 33.

The upper roller 34 is hollow and similar to roller 7. Roller 34 is provided with a vertically movable journal bearing 35 and the hollow shaft 36 is also equipped to introduce the heating fluid. Vertical guides 37 permit the movement of the journal 36 under the adjustment of the screw-thread 38 and adjusting nut 39.

In advance of the roller 32 is provided a second roller supply 40 from which the film 29 is drawn upwardly to the stand 31. This film 29 is coated on its upper surface with a resinous or similar substance which will be thermoplastic and adherent.

The paper web 20 drawn through the standard 5 has applied to its upper side a coating of film 19 due to the momentary application of pressure and heat. As the coated paper 20 travels between the rollers 32 and 34 it is coated on its lower exposed paper side with the cellulose film 29. Thus the strip 41 leaving the rolls 32 and 34 is a three-ply article having a paper layer 20 coated on each side with a film.

It will be observed that in the rollers 7 and 9 the heat is transmitted through the paper to the film so that the paper is heated to a greater degree than is the film. When the second film 29 is applied the heat has been shown as applied through the partially coated paper. It may, however, be applied directly to film 29 by making the roller 32 the heated one.

The heating of the sheets and webs is controlled depending on their thickness. In like manner, where the heating is found to stiffen or dry the material, the coated web may be moistened or humidified by any suitable means or otherwise treated before removal for storage or use.

The operations above described permit the ready and uniform production in a continuous manner of a paper or fabric strip which is coated on one or both sides with a water-proof film. This film supplies a transparent or decorative coating on one or both sides of the paper which enhances the decoration or printing upon the paper and gives the paper qualities of repelling water, odors or the like.

The adhesion or welding between the paper and one or both films may be varied by change in the character of the resinous coatings of the film and the degree of tension provided for the rollers. In this way the film may be supported and reinforced by the paper until such time as it is desired to separate the film for independent use. This is desirable in some forms of photographing, photolithography or the production of transparencies.

While the preferred form of my invention has been described it is to be understood that the scope is limited only by the scope of the following claims:

I claim:

1. A method of laminating non-fibrous film to base material, comprising the steps of feeding non-fibrous film having at least one thermo-adhesive surface directly from a supply roll between two pressure-applying rollers; feeding base material from a supply roll into contact with the thermo-adhesive surface of said film between said pressure-applying rollers; applying heat to said film sufficient to render said thermo-adhesive surface directly adhesive, and at the same time applying rigid pressure and resilient counter pressure in opposed relation to said non-fibrous film and said base material to render said adhesive surface of said non-fibrous film adherent to said base material.

2. A method of laminating non-fibrous film to base material, comprising the steps of feeding base material directly from a supply roll; feeding at least one strip of non-fibrous film having a thermo-adhesive surface directly from a supply roll with the thermo-adhesive surface of said film in contact with said base material; applying heat to said film sufficient to render said thermo-adhesive surface directly adhesive, and at the same time applying rigid pressure and resilient counter pressure in opposed relation to said non-fibrous film and said base material to render said adhesive surface adherent to said base material.

3. In a method of laminating non-fibrous film having a thermoplastic adhesive surface to base material, the steps comprising applying the thermoplastic adhesive surface of the non-fibrous film into contact with base material and feeding said non-fibrous film and said base material between pressure applying rollers; applying heat to said non-fibrous film sufficient to render said thermoplastic adhesive surface directly adhesive, and at the same time applying rigid pressure and resilient counter pressure in opposed relation to said film and said base material to render said adhesive surface adherent to said base material.

4. In a method of laminating film having a thermo-adhesive surface to base material, the steps comprising applying the thermo-adhesive surface of film into contact with a sheet of base material; feeding said film and said sheet of base material between two pressure-applying rollers; applying heat to said film sufficient to render said thermo-adhesive surface directly adhesive, and at the same time applying rigid pressure and resilient counter pressure in opposed relation to said film and said sheet of base material to render said adhesive surface adherent to said sheet of base material.

5. In a method of laminating film having a thermo-adhesive surface to base material, the steps comprising applying the thermo-adhesive surface of film into contact with base material; applying heat to and through said base material to the thermo-adhesive surface of said film to render said surface adhesive, and at the same time applying rigid pressure and resilient counter pressure in opposed relation to said film and said base material to render said adhesive surface adherent to said base material.

6. In a method of laminating film having a thermoplastic adhesive surface to base material, the steps comprising applying the thermoplastic adhesive surfaces of two strips of film into contact with the two sides of the base material; applying heat to said film sufficient to render said thermoplastic adhesive surface adhesive, and at the same time applying rigid pressure and resilient counter pressure in opposed relation to said film and said base material to render said adhesive surface adherent to said base material; cutting into sections the composite comprising said strips of film and said base material.

7. In a method of laminating film having a thermoplastic adhesive surface to base material, the steps comprising applying the thermoplastic adhesive surface of film into contact with base material; applying said film and said base material into contact with slip-sheet material; feeding said slip-sheet material, said contacting base material and said film between heated pressure-applying rollers; applying rigid pressure and resilient counter pressure in opposed relation to said slip-sheet material, said base material and said film between said rollers, and at the same time heating the thermoplastic adhesive surface of said film sufficient to render said surface adhesive and adherent to said base material.

8. In a method of laminating film having a thermoplastic adhesive surface to base material, the steps comprising applying base material into contact with slip-sheet material; applying the thermoplastic adhesive surface of film into contact with said base material; feeding said slip-sheet material, said contacting base material and said film between pressure-applying rollers; applying rigid pressure and resilient counter pressure in opposed relation to said slip-sheet material, said base material and said film, and at the same time laminating said film to said base material under a degree of temperature and pressure sufficient to render said thermoplastic adhesive surface firmly adherent to said base material; removing said slip-sheet material.

9. In a method of laminating film having a thermoplastic adhesive surface to base material, the steps comprising applying the thermoplastic adhesive surface of film into contact with moistened base material; applying said film and said base material into contact with slip-sheet material; feeding said slip-sheet material, said contacting base material and said film between heated pressure-applying rollers; applying rigid pressure and resilient counter pressure in opposed relation to said slip-sheet material, said base material and said film between said rollers, and at the same time applying heat from said rollers to and through said slip-sheet material to and through said base material to the thermoplastic adhesive surface of said film and to and through said film to render said surface adhesive and adherent to said base material; removing said slip-sheet material; winding the composite comprising said base material and said film into a roll with the film side out.

10. In a method of laminating film to base material, the steps comprising feeding and applying slip-sheet material into contact with a heated metal surface; feeding and applying base material into contact with said slip-sheet material; heating film having a thermo-adhesive surface to render said surface slightly adhesive; bringing said slightly adhesive surface into contact with said base material; bringing a heated non-metallic surface into contact with said film; applying heat to and through said slip-sheet material, said base material and said film to the thermo-adhesive surface of said film to render said slightly adhesive surface fully adhesive, and at the same time applying rigid pressure and resilient counter pressure in opposed relation to said slip-sheet material, said base material and said film between said metal and said non-metallic surfaces to render the fully adhesive surface of said film adherent to said base material; removing said slip-sheet material, said base material and said adherent film from between said metal and said non-metallic surfaces; removing said slip-sheet material from contact with the composite comprising said base material and said film; winding said composite into a roll.

11. In a method of laminating film having a thermoplastic adhesive surface to base material, the steps comprising applying base material into contact with feeding slip-sheet material; applying the thermoplastic adhesive surface of film into contact with said base material; applying rigid pressure and resilient counter pressure in opposed relation to said slip-sheet material, said base material and said film, and at the same time heating the thermoplastic adhesive surface of said film to render said surface adhesive and adherent to said base material.

12. In a method of laminating film having a thermo-adhesive surface to base material, the steps comprising moistening base material; applying the thermo-adhesive surface of film into contact with said moistened base material; heating said film to render said thermo-adhesive surface adhesive, and at the same time applying rigid pressure and resilient counter pressure in opposed relation to said film and said base material to render said adhesive surface adherent to said base material.

13. In a method of laminating film to base material, the steps comprising feeding and applying slip-sheet material into contact with a heated metal surface; moistening fibrous base material; bringing said moistened fibrous base material into contact with said slip-sheet material; heating film having a thermo-adhesive surface to render said surface slightly adhesive; bringing said slightly adhesive surface into contact with said base material; heating a non-metallic surface by means of said heated metal surface; bringing said heated non-metallic surface into contact with said film; applying heat to and through said slip-sheet material, said base material and said film to render said slightly adhesive surface fully adhesive, and at the same time applying rigid pressure and resilient counter pressure in opposed relation to said slip-sheet material, said base material and said film between said metal and said non-metallic surfaces to render the fully adhesive surface of said film adherent to said base material; removing said slip-sheet material, said base material and said adherent film from between said metal and said non-metallic surfaces; removing said slip-sheet material from contact with the composite comprising said base material and said film; winding said composite into a roll.

14. In a method of laminating film having a thermoplastic adhesive surface to base material, the steps comprising moistening base material; applying the thermoplastic adhesive surface of film into contact with said moistened base material; applying said base material and said contacting film into contact with slip-sheet material; applying rigid pressure and resilient counter pressure in opposed relation to said slip-sheet material, said base material and said film, and at the same time heating the thermoplastic adhesive surface of said film to render said surface directly adhesive and adherent to said base material.

15. In a method of laminating film to base material, the steps comprising feeding and applying slip-sheet material into contact with a heated metal surface; bringing fibrous base material into contact with said slip-sheet material; heating film having a thermo-adhesive surface to render said thermo-adhesive surface slightly adhesive; bringing said slightly adhesive surface into contact with said fibrous base material; applying heat to a rubber surface from said heated metal surface; bringing said heated rubber surface into contact with said film; applying heat through said metal surface to and through said slip-sheet material to and through said fibrous base material to the slightly adhesive surface of said film, and applying heat from said rubber surface to and through said film, to render said slightly adhesive surface fully adhesive; applying rigid pressure and resilient counter pressure in opposed relation to said slip-sheet material, said fibrous base material and said film between said metal and said rubber surfaces to render said fully adhesive surface adherent to said base material; removing said slip-sheet material from contact with the composite comprising said base material and said film; winding said composite into a roll.

16. In a method of laminating film having a thermo-adhesive surface to base material, the steps comprising applying film into contact with a resilient non-metallic counter pressure applying surface; applying base material into contact with the thermo-adhesive surface of said film; applying a smooth rigid metal pressure applying surface into contact with said base material; applying heat from said metal surface to and through said base material to the thermo-adhesive surface of said film and to said non-metallic surface, and applying heat from said non-metallic surface to and through said film, to render the thermo-adhesive surface of said film directly adhesive, and at the same time causing said non-metallic and said metallic surfaces to apply a rigid pressure and resilient counter pressure in opposed relation to said film and said base material to render said adhesive surface adherent to said base material.

17. In a method of laminating film having a thermo-adhesive surface to base material, the steps comprising applying film into contact with a metal surface; applying base material into contact with the thermo-adhesive surface of said film; applying a non-metallic surface into contact with said base material; applying heat to said film and said base material between said metal and said non-metallic surfaces to render the thermo-adhesive surface of said film adhesive, and at the same time applying rigid pressure and resilient counter pressure in opposed relation to said film and said base material to render said surface adherent to said base material.

CLYDE SCOTT.